United States Patent Office 3,499,900
Patented Mar. 10, 1970

---

3,499,900
PROCESS FOR PREPARATION OF PIPERAZYL ALKYL DERIVATIVES OF TETRAZOLES
Robert Norman Schut, Edwardsburg, Mich., and Herbert John Havera, Elkhart, Ind., assignors to Miles Laboratories, Inc., Elkhart, Ind., a corporation of Indiana
No Drawing. Filed May 3, 1967, Ser. No. 635,699
Int. Cl. C07d *51/70*
U.S. Cl. 260—268      5 Claims

ABSTRACT OF THE DISCLOSURE

A process for the synthesis of piperazylalkyl derivatives of tetrazoles having beneficial pharmacological properties. Generally the synthesis involves the acylation of a piperazine with a suitable haloalkanoyl halide, substitution of the resulting ω-haloalkanoylpiperazine by cyanide ion, closing of the ring on the resulting ω-cyanoamide with azide ion to form an ω-tetrazolylamide and reduction of the amide to the desired amine.

---

This invention relates to the synthesis of tetrazole derivatives and more particularly to a novel process for the synthesis of piperazylalkyl derivatives of tetrazoles having beneficial pharmacological properties.

Compounds synthesized according to the process of this invention can be represented by means of the structural formula:

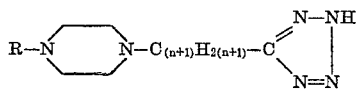

in which R represents a member selected from a group consisting of phenyl and substituted phenyl wherein the substituents are selected from the group consisting of chloro, fluoro, and trifluoromethyl and $n$ is an integer between about 1 and 3.

Compounds of this invention can be furnished in forms of various salts, for example, as salts of mineral acids such as hydrochloride, or as salts of organic acids, such as an oxalate or maleate. In general, salts which are pharmacologically acceptable are used. Representative of these compounds, in the form of a salt, is 5-[2-(4-phenyl-1-piperazyl)ethyl]tetrazole monohydrochloride which has the formula:

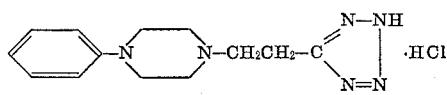

The novel piperazylalkyltetrazole derivatives of this invention are useful as anti-hypertensive agents.

In the process of the invention novel oxo compounds are formed having the structural formula:

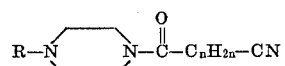

and

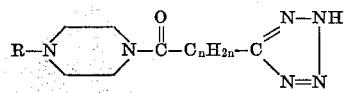

which are useful as intermediates in the process of the invention.

In U.S. Patent No. 3,231,574, issued Jan. 25, 1966, to Wallace Glenn Strycker and Shin Hayao and assigned to the instant assignee, a process is described for synthesizing tetrazole derivatives corresponding to tetrazole derivatives prepared by the novel process of this invention. Tetrazole derivatives are prepared in U.S. Patent No. 3,231,574, by reacting the appropriate nitrile with an azide salt of a monovalent cation. Thus it is necessary to have the appropriate 4-aryl-1-(ω-cyanoalkyl) piperazine for conversion to the tetrazole.

Therefore, it is an object of this invention to provide a novel process for synthesizing tetrazole derivatives.

A further object of this invention is to provide a process for synthesizing desirable tetrazole derivatives with readily available reactants which process has satisfactory overall yields.

Other objects and advantages of this invention will become apparent from the following description.

The invention is generally embodied in a process for synthesizing a compound of the structural formula:

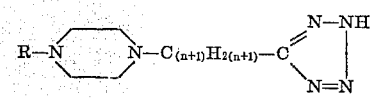

in which R and $n$ correspond respectively with their previous description. A compound of this structural formula can be prepared according to the following general reaction sequence.

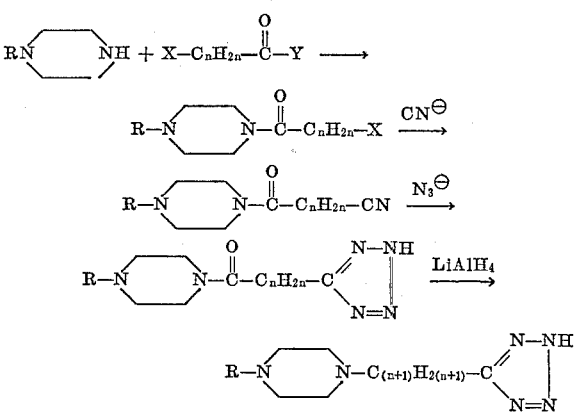

X and Y are halogen atoms and can be the same or different.

The first step of this reaction sequence is an acylation of a piperazine with a suitable haloalkanoyl halide to form an N-(ω-haloalkanoyl) piperazine. In a substitution reaction with cyanide ion, the resulting N-(ω-haloalkanoyl) piperazine is converted to an N-(ω-cyanoalkanoyl) piperazine. Ring closure is effected by the reacting N-(ω-cyanoalkanoyl) piperazine with azide ion such as from an azide salt of a monovalent cation or hydrazoic acid. Reduction with LiAlH₄ produces the desired compound.

More specifically, a piperazine is reacted with a suitable haloalkanoyl halide, preferably a halo acetyl halide, such as chloroacetylchloride. This reaction is carried out in the presence of a base, for example, a hydroxide or carbonate. Sodium hydroxide or sodium carbonate are examples of bases which may be used. Although the conditions of the reaction are not considered critical, the reactants are advantageously mixed slowly while being maintained at a low temperature. A mixing temperature of about 0° C. is considered satisfactory. The resulting solution is preferably stirred for three or more hours while maintaining it at between 0° to 10° C.

The amide resulting from the first step in the reaction sequence is then substituted with a cyanide ion from a suitable source to form an amide. This cyanide ion source may be an inorganic cyanide compound and is preferably a compound such as sodium cyanide, potassium cyanide, etc. To facilitate the reaction the reactants are generally dissolved in suitable solvents such as methanol and water, respectively. The reactants are heated and beneficially maintained under reflux in excess of 4 hours. Again, the reaction conditions are not considered critical and may be varied while still obtaining satisfactory results.

A tetrazole is conveniently formed by reacting the amide-nitrile intermediate with an azide salt of a monovalent cation or hydrazoic acid. Examples of such an azide salt include lithium azide, sodium azide, potassium azide, ammonium azide and substituted ammonium azides. For this reaction it is desirable to utilize a suitable solvent and catalyst. For the solvent there may be used any organic solvent which will facilitate the reaction, that is, any ionizing solvent in which the reactants are soluble. Dimethylformamide (DMF), for example, is a suitable solvent. For a catalyst it is preferred to use an ammonium compound such as ammonium chloride or an amine hydrochloride. Reaction conditions are not critical, although refluxing of the reaction mixture for an extended period of time, for example between about 6 to 24 hours, has been found advantageous.

The tetrazole formed by the ring closure is reacted with $LiAlH_4$ to reduce the amide function. Dry tetrahydrofuran (THF) is beneficially used as a solvent in this step. This reaction is carried out at elevated temperatures, preferably with reflux, for periods in excess of about 6 hours. The desired tetrazole may be concentrated and recrystallized at this point or an acceptable salt formed in an additional step.

The invention will be further described in the following example which illustrates the preparation of a specific tetrazole derivative according to the synthetic process of this invention. The invention is not to be construed as limited in scope by this example, as it will be apparent that numerous other compounds may be similarly prepared with this novel process without departing from the invention.

EXAMPLE.—5-[2-(4-PHENYL-1-PIPERAZYL) ETHY]TETRAZOLE (A) 4-phenyl-1-chloroacetylpiperazine To 32.4 g. (0.20 mole) of phenylpiperazine in 150 ml. of benzene was added 50 ml. of 20% sodium hydroxide and 22.5 g. (0.20 mole) of chloroacetylchloride dropwise with stirring at about 0° C. After the addition was complete, the solution was stirred for 3 hours at about 0–10° C. The layers were separated and the benzene layer was washed with water and dried over $MgSO_4$. The benzene was concentrated in vacuo leaving a solid material which was filtered and washed with ether. Yield 28.0 g., M.P. 74–75°

$\nu_{max}^{CHCl_3}$ 1660 cm.$^{-1}$ (amide carbonyl).

(B) 4-phenyl-1-cyanoacetylpiperazine

To 5.8 g. (0.12 mole) of sodium cyanide in 10 ml. of water was added dropwise 28.0 g. (0.11 mole) of 1-phenyl-4-chloroacetylpiperazine in 200 ml. of methanol. The solution was then heated on a steam bath for 4 hours and filtered while hot to remove sodium chloride. The methanol was concentrated in vacuo leaving a tan solid. The tan solid was recrystallized from a methanol, chloroform and ether mixture giving 14.0 g. of product melting at 130–132° C.

$\nu_{max}^{CHCl_3}$ 2260 cm.$^{-1}$ (nitrile), 1660 cm.$^{-1}$ (amide carbonyl).

(C) 4-phenyl-1-(5-tetrazolylacetyl) piperazine

To 18.0 g. (0.078 mole) of 1-phenyl-4-cyanoacetylpiperazine in 75 ml. of DMF was added 5.85 g. (0.09 mole) of sodium azide and 4.8 g. (0.09 mole) of ammonium chloride. The mixture was then heated in a wax bath at 125–130° C. with stirring for 6 hours. The DMF was concentrated in vacuo and a brown solid remained which was recrystallized twice from a methanol and DMF mixture. Yield 5.5 g., M.P. 232–234° C.

Analysis.—Calcd. for $C_{13}H_{16}N_6O$ (percent): C, 57.34; H, 5.92; N, 30.87. Found (percent): C, 56.98; H, 5.93; N, 30.91.

(D) 5-[2-(4-phenyl-1-piperazyl)ethyl] tetrazole hydrochloride

To 1.5 g. of lithium aluminum hydride in 100 ml. of dry THF was added 6.0 g. (0.022 mole) of 4-phenyl-1-(5-tetrazolylacetyl)piperazine in 50 ml. of THF with stirring. The reaction mixture was then refluxed for 6 hours. Excess lithium aluminum hydride was destroyed by adding 2 ml. of a 10% aqueous THF solution, 2 ml. of 20% sodium hydroxide, and 6 ml. of water. The solution was filtered and the filtrate was concentrated in vacuo leaving a tan solid. A hydrochloride salt was prepared by adding excess 2.8 N HCl in isopropyl alcohol to the free base formed above in methanol. Upon addition of ether a solid formed which was recrystallized twice from an aqueous methanol ether mixture. Yield 4.5 g., M.P. 206–207° C.

Analysis.—Calcd. for $C_{13}H_{19}ClN_6$ (percent); C. 52.98; H, 6.50; N, 28.51. Found (percent): C, 52.66; H, 6.61; N, 28.57.

Other compounds which can be similarly prepared are shown in Table I with their physical and chemical characteristics.

TABLE I

| Compd. No. | Chemical name and structure | Melting point, °C. | Formula | Analysis Calculated C | H | N | Found C | H | N |
|---|---|---|---|---|---|---|---|---|---|
| 1 | 5-[2-((4-phenyl-1-piperazyl)ethyl] tetrazole dihydrochloride | 200–201 (dec.) | $C_{13}H_{18}N_6.2HCl$ | 47.2 | 6.05 | 25.4 | 47.2 | 6.31 | 25.6 |
| 2 | 5-[2-(4-p-fluorophenyl-1-piperazyl)ethyl]tetrazole | 194–196 (dec.) | $C_{13}H_{17}FN_6.2HCl$ | 44.7 | 5.45 | 25.1 | 44.7 / 44.3 | 5.03 / 5.49 | 23.8 |

TABLE I—Continued

| Compd. No. | Chemical name and structure | Melting point, °C | Formula | Analysis Calculated | | | Analysis Found | | |
|---|---|---|---|---|---|---|---|---|---|
| | | | | C | H | N | C | H | N |
| 3 | 5-[2-(4-m-trifluoromethylphenyl-1-piperazyl)ethyl]tetrazole dihydrochloride 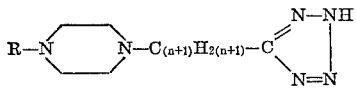 | 184–186 (dec.) | $C_{14}H_{17}F_3N_6 \cdot 2HCl$ | 42.2 | 4.76 | 21.0 | 42.3 | 4.78 | 21.2 |
| 4 | 5-[3-(4-phenyl-1-piperazyl)propyl]tetrazole 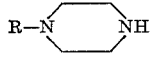 | 188–189 (dec.) | $C_{14}H_{20}N_6$ | 61.76 | 7.35 | 30.88 | 61.61 | 7.22 | 30.64 |
| 5 | 5-[3-(4-m-chlorophenyl-1-piperazyl)propyl]tetrazole 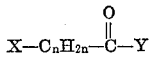 | 165–166 | $C_{14}H_{19}ClN_6$ | 54.7 | 6.20 | 27.4 | 54.7 | 6.47 | 27.4 |
| 6 | 5-[4-(4-phenyl-1-piperazyl)butyl]tetrazole trihydrochloride 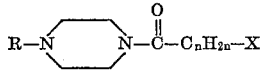 | 198–199 (dec.) | $C_{15}H_{22}N_6 \cdot 3HCl$ | 45.5 | 6.32 | 21.2 | 45.7 | 6.20 | 21.1 |

The above description and example show that the present invention provides a novel process for the synthesis of piperazylalkyl derivatives of tetrazoles and the oxo analogs thereof having beneficial pharmacological properties.

Moreover, with the process of this invention desirable tetrazole derivatives may be synthesized from readily available reactants in satisfactory overall yields.

What is claimed is:

1. A process for the preparation of a compound of the formula:

R—N⟨piperazine⟩N—C$_{(n+1)}$H$_{2(n+1)}$—C⟨tetrazole NH⟩ in which R is phenyl or substituted phenyl wherein the substituents are chloro, fluoro or trifluoromethyl and $n$ is an integer of from about 1 to 3 which process comprises mixing a piperazine of the formula:

R—N⟨piperazine⟩NH with a haloalkanoyl halide of the formula:

$$X-C_nH_{2n}-\overset{O}{\underset{\|}{C}}-Y$$

wherein X and Y are halogen atoms and can be the same or different, in the presence of a base; separating a product of the formula:

R—N⟨piperazine⟩N—C(=O)—C$_n$H$_{2n}$—X from the mixture; heating the product in a solution containing cyanide ions; separating a nitrile of the formula:

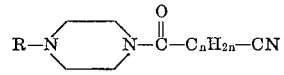

from the solution; heating the nitrile in a solution including azide ions; separating a reaction product of the formula:

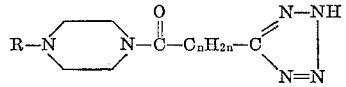

from the solution and reducing the reaction product to form the desired compound.

2. A process according to claim 1 in which the piperazine is acylated with a lower alkanoyl halide in the presence of a basic catalyst.

3. A process according to claim 1 in which the cyanide ions are derived from NaCN, KCN, LiCN or $NH_4CN$.

4. A process according to claim 1 in which the azide ions are derived from an azide salt of a monovalent cation selected from lithium azide, sodium azide, potassium azide, or ammonium azide.

5. A process according to claim 1 in which the nitrile is reacted with sodium azide in the presence of an ammonium chloride catalyst.

References Cited

UNITED STATES PATENTS

| 3,037,024 | 5/1962 | Parcell | 260—268 |
| 3,155,666 | 11/1964 | Cusil | 260—268 |
| 3,231,574 | 1/1966 | Strycker et al. | 260—268 |
| 3,362,956 | 1/1968 | Archer | 260—268 |
| 3,417,096 | 12/1968 | Juby | 260—308 |

DONALD G. DAUS, Primary Examiner

U.S. Cl. X.R.

260—308, 544, 999